United States Patent
Paulson

Patent Number: 5,893,078
Date of Patent: Apr. 6, 1999

[54] SYSTEM AND METHOD FOR DETERMINING OPTIMAL SWEEP THRESHOLD PARAMETERS FOR DEMAND DEPOSIT ACCOUNTS

[75] Inventor: Frank L. Paulson, Dallas, Tex.

[73] Assignee: Carreker-Antinori, Inc., Dallas, Tex.

[21] Appl. No.: 825,012

[22] Filed: Mar. 26, 1997

[51] Int. Cl.$^6$ .................................................. G06F 17/00
[52] U.S. Cl. ..................... 705/35; 345/329; 395/200.47; 395/200.48
[58] Field of Search .................................. 705/1, 10, 35, 705/36, 37, 39; 345/329, 331, 335; 395/200.3, 200.33, 200.47, 200.48, 200.49, 200.57, 200.61

[56] References Cited

U.S. PATENT DOCUMENTS

5,679,940  10/1997  Templeton et al. ...................... 235/380

Primary Examiner—Thomas Peeso
Attorney, Agent, or Firm—Hitt Chwang & Gaines, P.C.

[57] ABSTRACT

In a financial institution accounting system, a system for, and method of, determining an optimal sweep threshold parameter for a demand deposit account ("DDA"), the DDA having a sub-DDA contra-account and a sub-money market account ("sub-MMA") associated therewith. The system includes: (1) an initialization routine that sets a trial sweep threshold parameter equal to a value that is a function of an activity of the DDA during a historical period of time and (2) a trial sweep routine that performs a trial sweep process on the DDA during the period of time, a timing of sweeps from the sub-MMA to the sub-DDA occurring during the trial sweep process being a function of the trial sweep threshold parameter, the sweep routine repeated with a modified trial sweep threshold parameter until modification of the trial sweep threshold parameter fails to produce an increase in an average balance of the sub-MMA for the predetermined period of time, the trial sweep threshold parameter thereby determined to be an optimal sweep threshold parameter for the DDA.

40 Claims, 9 Drawing Sheets

Threshold: $2040.00 (Sum of Debits / 5)

| DAY SEQ. 310 | ACCOUNT NUMBER | BALANCE 320 | PREVIOUS BALANCE | BALANCE CHANGE 330 | SUB-DDA BALANCE 340 | SUB-MMA BALANCE 350 | NBR. SWPS. 360 |
|---|---|---|---|---|---|---|---|
| 1 | 323000448 | $5,000 | | | $2,040.00 | $2,960.00 | 0 |
| 2 | 323000448 | $4,500 | $5,000 | ($500) | $1,540.00 | $2,960.00 | 0 |
| 3 | 323000448 | $4,500 | $4,500 | | $1,540.00 | $2,960.00 | 0 |
| 4 | 323000448 | $3,000 | $4,500 | ($1,500) | $40.00 | $2,960.00 | 0 |
| 5 | 323000448 | $2,500 | $3,000 | ($500) | $2,040.00 | $460.00 | 1 |
| 6 | 323000448 | $2,000 | $2,500 | ($500) | $1,540.00 | $460.00 | 1 |
| 7 | 323000448 | $1,800 | $2,000 | ($200) | $1,340.00 | $460.00 | 1 |
| 8 | 323000448 | $1,500 | $1,800 | ($300) | $1,040.00 | $460.00 | 1 |
| 9 | 323000448 | $1,000 | $1,500 | ($500) | $540.00 | $460.00 | 1 |
| 10 | 323000448 | $500 | $1,000 | ($500) | $40.00 | $460.00 | 1 |
| 11 | 323000448 | $300 | $500 | ($200) | $300.00 | | 2 |
| 12 | 323000448 | $200 | $300 | ($100) | $200.00 | | 2 |
| 13 | 323000448 | $200 | $200 | | $200.00 | | 2 |
| 14 | 323000448 | $200 | $200 | | $200.00 | | 2 |
| 15 | 323000448 | $6,500 | $200 | $6,300 | $2,040.00 | $4,460.00 | 2 |
| 16 | 323000448 | $6,300 | $6,500 | ($200) | $1,840.00 | $4,460.00 | 2 |
| 17 | 323000448 | $6,200 | $6,300 | ($100) | $1,740.00 | $4,460.00 | 2 |
| 18 | 323000448 | $5,500 | $6,200 | ($700) | $1,040.00 | $4,460.00 | 2 |
| 19 | 323000448 | $5,500 | $5,500 | | $1,040.00 | $4,460.00 | 2 |
| 20 | 323000448 | $4,500 | $5,500 | ($1,000) | $40.00 | $4,460.00 | 2 |
| 21 | 323000448 | $4,100 | $4,500 | ($400) | $2,040.00 | $2,060.00 | 3 |
| 22 | 323000448 | $3,100 | $4,100 | ($1,000) | $1,040.00 | $2,060.00 | 3 |
| 23 | 323000448 | $2,600 | $3,100 | ($500) | $540.00 | $2,060.00 | 3 |
| 24 | 323000448 | $2,200 | $2,600 | ($400) | $140.00 | $2,060.00 | 3 |
| 25 | 323000448 | $4,200 | $2,200 | ($2,000) | $2,040.00 | $2,160.00 | 3 |
| 26 | 323000448 | $4,000 | $4,200 | ($200) | $1,840.00 | $2,160.00 | 3 |
| 27 | 323000448 | $3,700 | $4,000 | ($300) | $1,540.00 | $2,160.00 | 3 |
| 28 | 323000448 | $3,500 | $3,700 | ($200) | $1,340.00 | $2,160.00 | 3 |
| 29 | 323000448 | $3,100 | $3,500 | ($400) | $940.00 | $2,160.00 | 3 |
| 30 | 323000448 | $3,100 | $3,100 | | $940.00 | $2,160.00 | 3 |
| Averages: | | $ 3,176.67 | | | | $2,085.33 | 65.6% |

Figure 3

Threshold: $6500.00 (Start with high balance)

| DAY SEQ. 310 | ACCOUNT NUMBER | BALANCE 320 | PREVIOUS BALANCE | BALANCE CHANGE 330 | SUB-DDA BALANCE 340 | SUB-MMA BALANCE 350 | NBR. SWPS. 360 |
|---|---|---|---|---|---|---|---|
| 1 | 323000448 | $5,000 | | | $5,000 | | 0 |
| 2 | 323000448 | $4,500 | $5,000 | ($500) | $4,500 | | 0 |
| 3 | 323000448 | $4,500 | $4,500 | | $4,500 | | 0 |
| 4 | 323000448 | $3,000 | $4,500 | ($1,500) | $3,000 | | 0 |
| 5 | 323000448 | $2,500 | $3,000 | ($500) | $2,500 | | 0 |
| 6 | 323000448 | $2,000 | $2,500 | ($500) | $2,000 | | 0 |
| 7 | 323000448 | $1,800 | $2,000 | ($200) | $1,800 | | 0 |
| 8 | 323000448 | $1,500 | $1,800 | ($300) | $1,500 | | 0 |
| 9 | 323000448 | $1,000 | $1,500 | ($500) | $1,000 | | 0 |
| 10 | 323000448 | $500 | $1,000 | ($500) | $500 | | 0 |
| 11 | 323000448 | $300 | $500 | ($200) | $300 | | 0 |
| 12 | 323000448 | $200 | $300 | ($100) | $200 | | 0 |
| 13 | 323000448 | $200 | $200 | | $200 | | 0 |
| 14 | 323000448 | $200 | $200 | | $200 | | 0 |
| 15 | 323000448 | $6,500 | $200 | $6,300 | $6,500 | | 0 |
| 16 | 323000448 | $6,300 | $6,500 | ($200) | $6,300 | | 0 |
| 17 | 323000448 | $6,200 | $6,300 | ($100) | $6,200 | | 0 |
| 18 | 323000448 | $5,500 | $6,200 | ($700) | $5,500 | | 0 |
| 19 | 323000448 | $5,500 | $5,500 | | $5,500 | | 0 |
| 20 | 323000448 | $4,500 | $5,500 | ($1,000) | $4,500 | | 0 |
| 21 | 323000448 | $4,100 | $4,500 | ($400) | $4,100 | | 0 |
| 22 | 323000448 | $3,100 | $4,100 | ($1,000) | $3,100 | | 0 |
| 23 | 323000448 | $2,600 | $3,100 | ($500) | $2,600 | | 0 |
| 24 | 323000448 | $2,200 | $2,600 | ($400) | $2,200 | | 0 |
| 25 | 323000448 | $4,200 | $2,200 | ($2,000) | $4,200 | | 0 |
| 26 | 323000448 | $4,000 | $4,200 | ($200) | $4,000 | | 0 |
| 27 | 323000448 | $3,700 | $4,000 | ($300) | $3,700 | | 0 |
| 28 | 323000448 | $3,500 | $3,700 | ($200) | $3,500 | | 0 |
| 29 | 323000448 | $3,100 | $3,500 | ($400) | $3,100 | | 0 |
| 30 | 323000448 | $3,100 | $3,100 | | $3,100 | | 0 |
| Averages: | | $ 3,176.67 | | | | | 0% |

Figure 4a

Threshold: $1.58 (Last Iteration of this Phase)

| DAY SEQ. 310 | ACCOUNT NUMBER | BALANCE 320 | PREVIOUS BALANCE | BALANCE CHANGE 330 | SUB-DDA BALANCE 340 | SUB-MMA BALANCE 350 | NBR. SWPS. 360 |
|---|---|---|---|---|---|---|---|
| 1  | 323000448 | $5,000 |        |           | $1.58      | $4,998.42 | 0 |
| 2  | 323000448 | $4,500 | $5,000 | ($500)    | $1.58      | $4,498.42 | 1 |
| 3  | 323000448 | $4,500 | $4,500 |           | $1.58      | $4,498.42 | 1 |
| 4  | 323000448 | $3,000 | $4,500 | ($1,500)  | $1.58      | $2,998.42 | 2 |
| 5  | 323000448 | $2,500 | $3,000 | ($500)    | $1.58      | $2,498.42 | 3 |
| 6  | 323000448 | $2,000 | $2,500 | ($500)    | $1.58      | $1,998.42 | 4 |
| 7  | 323000448 | $1,800 | $2,000 | ($200)    | $1.58      | $1,798.42 | 5 |
| 8  | 323000448 | $1,500 | $1,800 | ($300)    | $1,500.00  |           | 6 |
| 9  | 323000448 | $1,000 | $1,500 | ($500)    | $1,000.00  |           | 6 |
| 10 | 323000448 | $500   | $1,000 | ($500)    | $500.00    |           | 6 |
| 11 | 323000448 | $300   | $500   | ($200)    | $300.00    |           | 6 |
| 12 | 323000448 | $200   | $300   | ($100)    | $200.00    |           | 6 |
| 13 | 323000448 | $200   | $200   |           | $200.00    |           | 6 |
| 14 | 323000448 | $200   | $200   |           | $200.00    |           | 6 |
| 15 | 323000448 | $6,500 | $200   | $6,300    | $6,500.00  |           | 6 |
| 16 | 323000448 | $6,300 | $6,500 | ($200)    | $6,300.00  |           | 6 |
| 17 | 323000448 | $6,200 | $6,300 | ($100)    | $6,200.00  |           | 6 |
| 18 | 323000448 | $5,500 | $6,200 | ($700)    | $5,500.00  |           | 6 |
| 19 | 323000448 | $5,500 | $5,500 |           | $5,500.00  |           | 6 |
| 20 | 323000448 | $4,500 | $5,500 | ($1,000)  | $4,500.00  |           | 6 |
| 21 | 323000448 | $4,100 | $4,500 | ($400)    | $4,100.00  |           | 6 |
| 22 | 323000448 | $3,100 | $4,100 | ($1,000)  | $3,100.00  |           | 6 |
| 23 | 323000448 | $2,600 | $3,100 | ($500)    | $2,600.00  |           | 6 |
| 24 | 323000448 | $2,200 | $2,600 | ($400)    | $2,200.00  |           | 6 |
| 25 | 323000448 | $4,200 | $2,200 | ($2,000)  | $4,200.00  |           | 6 |
| 26 | 323000448 | $4,000 | $4,200 | ($200)    | $4,000.00  |           | 6 |
| 27 | 323000448 | $3,700 | $4,000 | ($300)    | $3,700.00  |           | 6 |
| 28 | 323000448 | $3,500 | $3,700 | ($200)    | $3,500.00  |           | 6 |
| 29 | 323000448 | $3,100 | $3,500 | ($400)    | $3,100.00  |           | 6 |
| 30 | 323000448 | $3,100 | $3,100 |           | $3,100.00  |           | 6 |
| Averages: |  | $ 3,176.67 |  |  |  | $776.30 | 24.4% |

Note: Best MMA% was reached during this phase at the mid divide point shown in 4c

Figure 4b

Threshold: $1625.00 (Mid-Divide Point)

| DAY SEQ. 310 | ACCOUNT NUMBER | BALANCE 320 | PREVIOUS BALANCE | BALANCE CHANGE 330 | SUB-DDA BALANCE 340 | SUB-MMA BALANCE 350 | NBR. SWPS. 360 |
|---|---|---|---|---|---|---|---|
| 1 | 323000448 | $5,000 | | | $1,625 | $3,375 | 0 |
| 2 | 323000448 | $4,500 | $5,000 | ($500) | $1,125 | $3,375 | 0 |
| 3 | 323000448 | $4,500 | $4,500 | | $1,125 | $3,375 | 0 |
| 4 | 323000448 | $3,000 | $4,500 | ($1,500) | $1,625 | $1,375 | 1 |
| 5 | 323000448 | $2,500 | $3,000 | ($500) | $1,125 | $1,375 | 1 |
| 6 | 323000448 | $2,000 | $2,500 | ($500) | $625 | $1,375 | 1 |
| 7 | 323000448 | $1,800 | $2,000 | ($200) | $425 | $1,375 | 1 |
| 8 | 323000448 | $1,500 | $1,800 | ($300) | $125 | $1,375 | 1 |
| 9 | 323000448 | $1,000 | $1,500 | ($500) | $1,000 | | 2 |
| 10 | 323000448 | $500 | $1,000 | ($500) | $500 | | 2 |
| 11 | 323000448 | $300 | $500 | ($200) | $300 | | 2 |
| 12 | 323000448 | $200 | $300 | ($100) | $200 | | 2 |
| 13 | 323000448 | $200 | $200 | | $200 | | 2 |
| 14 | 323000448 | $200 | $200 | | $200 | | 2 |
| 15 | 323000448 | $6,500 | $200 | $6,300 | $1,625 | $4,875 | 2 |
| 16 | 323000448 | $6,300 | $6,500 | ($200) | $1,425 | $4,875 | 2 |
| 17 | 323000448 | $6,200 | $6,300 | ($100) | $1,325 | $4,875 | 2 |
| 18 | 323000448 | $5,500 | $6,200 | ($700) | $625 | $4,875 | 2 |
| 19 | 323000448 | $5,500 | $5,500 | | $625 | $4,875 | 2 |
| 20 | 323000448 | $4,500 | $5,500 | ($1,000) | $1,625 | $2,875 | 3 |
| 21 | 323000448 | $4,100 | $4,500 | ($400) | $1,225 | $2,875 | 3 |
| 22 | 323000448 | $3,100 | $4,100 | ($1,000) | $225 | $2,875 | 3 |
| 23 | 323000448 | $2,600 | $3,100 | ($500) | $1,625 | $975 | 4 |
| 24 | 323000448 | $2,200 | $2,600 | ($400) | $1,225 | $975 | 4 |
| 25 | 323000448 | $4,200 | $2,200 | ($2,000) | $1,625 | $2,575 | 4 |
| 26 | 323000448 | $4,000 | $4,200 | ($200) | $1,425 | $2,575 | 4 |
| 27 | 323000448 | $3,700 | $4,000 | ($300) | $1,125 | $2,575 | 4 |
| 28 | 323000448 | $3,500 | $3,700 | ($200) | $925 | $2,575 | 4 |
| 29 | 323000448 | $3,100 | $3,500 | ($400) | $525 | $2,575 | 4 |
| 30 | 323000448 | $3,100 | $3,100 | | $525 | $2,575 | 4 |
| Averages: | | $ 3,176.67 | | | | $2,246.67 | 70.7% |

Note: This was the best threshold reached during the divide-by-2 phase.

Figure 4c

Threshold: $4062.50 First Iteration of Optimize High ($6500 + $1625) / 2

| DAY SEQ. 310 | ACCOUNT NUMBER | BALANCE 320 | PREVIOUS BALANCE | BALANCE CHANGE 330 | SUB-DDA BALANCE 340 | SUB-MMA BALANCE 350 | NBR. SWPS. 360 |
|---|---|---|---|---|---|---|---|
| 1 | 323000448 | $5,000 | | | $4,062.50 | $937.50 | 0 |
| 2 | 323000448 | $4,500 | $5,000 | ($500) | $3,562.50 | $937.50 | 0 |
| 3 | 323000448 | $4,500 | $4,500 | | $3,562.50 | $937.50 | 0 |
| 4 | 323000448 | $3,000 | $4,500 | ($1,500) | $2,062.50 | $937.50 | 0 |
| 5 | 323000448 | $2,500 | $3,000 | ($500) | $1,562.50 | $937.50 | 0 |
| 6 | 323000448 | $2,000 | $2,500 | ($500) | $1,062.50 | $937.50 | 0 |
| 7 | 323000448 | $1,800 | $2,000 | ($200) | $862.50 | $937.50 | 0 |
| 8 | 323000448 | $1,500 | $1,800 | ($300) | $562.50 | $937.50 | 0 |
| 9 | 323000448 | $1,000 | $1,500 | ($500) | $62.50 | $937.50 | 0 |
| 10 | 323000448 | $500 | $1,000 | ($500) | $500.00 | | 1 |
| 11 | 323000448 | $300 | $500 | ($200) | $300.00 | | 1 |
| 12 | 323000448 | $200 | $300 | ($100) | $200.00 | | 1 |
| 13 | 323000448 | $200 | $200 | | $200.00 | | 1 |
| 14 | 323000448 | $200 | $200 | | $200.00 | | 1 |
| 15 | 323000448 | $6,500 | $200 | $6,300 | $4,062.50 | $2,437.50 | 1 |
| 16 | 323000448 | $6,300 | $6,500 | ($200) | $3,862.50 | $2,437.50 | 1 |
| 17 | 323000448 | $6,200 | $6,300 | ($100) | $3,762.50 | $2,437.50 | 1 |
| 18 | 323000448 | $5,500 | $6,200 | ($700) | $3,062.50 | $2,437.50 | 1 |
| 19 | 323000448 | $5,500 | $5,500 | | $3,062.50 | $2,437.50 | 1 |
| 20 | 323000448 | $4,500 | $5,500 | ($1,000) | $2,062.50 | $2,437.50 | 1 |
| 21 | 323000448 | $4,100 | $4,500 | ($400) | $1,662.50 | $2,437.50 | 1 |
| 22 | 323000448 | $3,100 | $4,100 | ($1,000) | $662.50 | $2,437.50 | 1 |
| 23 | 323000448 | $2,600 | $3,100 | ($500) | $162.50 | $2,437.50 | 1 |
| 24 | 323000448 | $2,200 | $2,600 | ($400) | $2,200.00 | | 2 |
| 25 | 323000448 | $4,200 | $2,200 | ($2,000) | $4,062.50 | $137.50 | 2 |
| 26 | 323000448 | $4,000 | $4,200 | ($200) | $3,862.50 | $137.50 | 2 |
| 27 | 323000448 | $3,700 | $4,000 | ($300) | $3,562.50 | $137.50 | 2 |
| 28 | 323000448 | $3,500 | $3,700 | ($200) | $3,362.50 | $137.50 | 2 |
| 29 | 323000448 | $3,100 | $3,500 | ($400) | $2,962.50 | $137.50 | 2 |
| 30 | 323000448 | $3,100 | $3,100 | | $2,962.50 | $137.50 | 2 |
| Averages: | | $ 3,176.67 | | | | $1,040.00 | 32.7% |

Figure 4d

Threshold: $1,625.59 (Last Iteration of Optimize High)

| DAY SEQ. 310 | ACCOUNT NUMBER | BEG. BALANCE 320 | PREVIOUS BALANCE | BALANCE CHANGE 330 | SUB-DDA BALANCE 340 | SUB-MMA BALANCE 350 | NBR. SWPS. 360 |
|---|---|---|---|---|---|---|---|
| 1 | 323000448 | $5,000 | | | $1,625.59 | $3,374.41 | 0 |
| 2 | 323000448 | $4,500 | $5,000 | ($500) | $1,125.59 | $3,374.41 | 0 |
| 3 | 323000448 | $4,500 | $4,500 | | $1,125.59 | $3,374.41 | 0 |
| 4 | 323000448 | $3,000 | $4,500 | ($1,500) | $1,625.59 | $1,374.41 | 1 |
| 5 | 323000448 | $2,500 | $3,000 | ($500) | $1,125.59 | $1,374.41 | 1 |
| 6 | 323000448 | $2,000 | $2,500 | ($500) | $625.59 | $1,374.41 | 1 |
| 7 | 323000448 | $1,800 | $2,000 | ($200) | $425.59 | $1,374.41 | 1 |
| 8 | 323000448 | $1,500 | $1,800 | ($300) | $125.59 | $1,374.41 | 1 |
| 9 | 323000448 | $1,000 | $1,500 | ($500) | $1,000.00 | | 2 |
| 10 | 323000448 | $500 | $1,000 | ($500) | $500.00 | | 2 |
| 11 | 323000448 | $300 | $500 | ($200) | $300.00 | | 2 |
| 12 | 323000448 | $200 | $300 | ($100) | $200.00 | | 2 |
| 13 | 323000448 | $200 | $200 | | $200.00 | | 2 |
| 14 | 323000448 | $200 | $200 | | $200.00 | | 2 |
| 15 | 323000448 | $6,500 | $200 | $6,300 | $1,625.59 | $4,874.41 | 2 |
| 16 | 323000448 | $6,300 | $6,500 | ($200) | $1,425.59 | $4,874.41 | 2 |
| 17 | 323000448 | $6,200 | $6,300 | ($100) | $1,325.59 | $4,874.41 | 2 |
| 18 | 323000448 | $5,500 | $6,200 | ($700) | $625.59 | $4,874.41 | 2 |
| 19 | 323000448 | $5,500 | $5,500 | | $625.59 | $4,874.41 | 2 |
| 20 | 323000448 | $4,500 | $5,500 | ($1,000) | $1,625.59 | $2,874.41 | 3 |
| 21 | 323000448 | $4,100 | $4,500 | ($400) | $1,225.59 | $2,874.41 | 3 |
| 22 | 323000448 | $3,100 | $4,100 | ($1,000) | $225.59 | $2,874.41 | 3 |
| 23 | 323000448 | $2,600 | $3,100 | ($500) | $1,625.59 | $974.41 | 4 |
| 24 | 323000448 | $2,200 | $2,600 | ($400) | $1,225.59 | $974.41 | 4 |
| 25 | 323000448 | $4,200 | $2,200 | ($2,000) | $1,625.59 | $2,574.41 | 4 |
| 26 | 323000448 | $4,000 | $4,200 | ($200) | $1,425.59 | $2,574.41 | 4 |
| 27 | 323000448 | $3,700 | $4,000 | ($300) | $1,125.59 | $2,574.41 | 4 |
| 28 | 323000448 | $3,500 | $3,700 | ($200) | $925.59 | $2,574.41 | 4 |
| 29 | 323000448 | $3,100 | $3,500 | ($400) | $525.59 | $2,574.41 | 4 |
| 30 | 323000448 | $3,100 | $3,100 | | $525.59 | $2,574.41 | 4 |
| Averages: | | $ 3,176.67 | | | | $2,246.19 | 70.7% |

Note: This was the best threshold reached during the Optimize High Phase.

Figure 4e

Threshold: $812.79 First Iteration of Optimize Low ($0 + $1625.59)/2 = $812.79

| DAY SEQ. 310 | ACCOUNT NUMBER | BALANCE 320 | PREVIOUS BALANCE | BALANCE CHANGE 330 | SUB-DDA BALANCE 340 | SUB-MMA BALANCE 350 | NBR. SWPS. 360 |
|---|---|---|---|---|---|---|---|
| 1 | 323000448 | $5,000 | | | $812.79 | $4,187.21 | 0 |
| 2 | 323000448 | $4,500 | $5,000 | ($500) | $312.79 | $4,187.21 | 0 |
| 3 | 323000448 | $4,500 | $4,500 | | $312.79 | $4,187.21 | 0 |
| 4 | 323000448 | $3,000 | $4,500 | ($1,500) | $812.79 | $2,187.21 | 1 |
| 5 | 323000448 | $2,500 | $3,000 | ($500) | $312.79 | $2,187.21 | 1 |
| 6 | 323000448 | $2,000 | $2,500 | ($500) | $812.79 | $1,187.21 | 2 |
| 7 | 323000448 | $1,800 | $2,000 | ($200) | $612.79 | $1,187.21 | 2 |
| 8 | 323000448 | $1,500 | $1,800 | ($300) | $312.79 | $1,187.21 | 2 |
| 9 | 323000448 | $1,000 | $1,500 | ($500) | $812.79 | $187.21 | 3 |
| 10 | 323000448 | $500 | $1,000 | ($500) | $312.79 | $187.21 | 3 |
| 11 | 323000448 | $300 | $500 | ($200) | $112.79 | $187.21 | 3 |
| 12 | 323000448 | $200 | $300 | ($100) | $12.79 | $187.21 | 3 |
| 13 | 323000448 | $200 | $200 | | $12.79 | $187.21 | 3 |
| 14 | 323000448 | $200 | $200 | | $12.79 | $187.21 | 3 |
| 15 | 323000448 | $6,500 | $200 | $6,300 | $812.79 | $5,687.21 | 3 |
| 16 | 323000448 | $6,300 | $6,500 | ($200) | $612.79 | $5,687.21 | 3 |
| 17 | 323000448 | $6,200 | $6,300 | ($100) | $512.79 | $5,687.21 | 3 |
| 18 | 323000448 | $5,500 | $6,200 | ($700) | $812.79 | $4,687.21 | 4 |
| 19 | 323000448 | $5,500 | $5,500 | | $812.79 | $4,687.21 | 4 |
| 20 | 323000448 | $4,500 | $5,500 | ($1,000) | $812.79 | $3,687.21 | 5 |
| 21 | 323000448 | $4,100 | $4,500 | ($400) | $412.79 | $3,687.21 | 5 |
| 22 | 323000448 | $3,100 | $4,100 | ($1,000) | $3,100.00 | | 6 |
| 23 | 323000448 | $2,600 | $3,100 | ($500) | $2,600.00 | | 6 |
| 24 | 323000448 | $2,200 | $2,600 | ($400) | $2,200.00 | | 6 |
| 25 | 323000448 | $4,200 | $2,200 | ($2,000) | $4,200.00 | | 6 |
| 26 | 323000448 | $4,000 | $4,200 | ($200) | $4,000.00 | | 6 |
| 27 | 323000448 | $3,700 | $4,000 | ($300) | $3,700.00 | | 6 |
| 28 | 323000448 | $3,500 | $3,700 | ($200) | $3,500.00 | | 6 |
| 29 | 323000448 | $3,100 | $3,500 | ($400) | $3,100.00 | | 6 |
| 30 | 323000448 | $3,100 | $3,100 | | $3,100.00 | | 6 |
| Averages: | | $ 3,176.67 | | | | $1,847.71 | 58.2% |

Figure 4f

Threshold: $1100.12 (Last Iteration of Optimize Low Phase)

| DAY SEQ. 310 | ACCOUNT NUMBER | BALANCE 320 | PREVIOUS BALANCE | BALANCE CHANGE 330 | SUB-DDA BALANCE 340 | SUB-MMA BALANCE 350 | NBR. SWPS. 360 |
|---|---|---|---|---|---|---|---|
| 1 | 323000448 | $5,000 | | | $1,100.12 | $3,899.88 | 0 |
| 2 | 323000448 | $4,500 | $5,000 | ($500) | $600.12 | $3,899.88 | 0 |
| 3 | 323000448 | $4,500 | $4,500 | | $600.12 | $3,899.88 | 0 |
| 4 | 323000448 | $3,000 | $4,500 | ($1,500) | $1,100.12 | $1,899.88 | 1 |
| 5 | 323000448 | $2,500 | $3,000 | ($500) | $600.12 | $1,899.88 | 1 |
| 6 | 323000448 | $2,000 | $2,500 | ($500) | $100.12 | $1,899.88 | 1 |
| 7 | 323000448 | $1,800 | $2,000 | ($200) | $1,100.12 | $699.88 | 2 |
| 8 | 323000448 | $1,500 | $1,800 | ($300) | $800.12 | $699.88 | 2 |
| 9 | 323000448 | $1,000 | $1,500 | ($500) | $300.12 | $699.88 | 2 |
| 10 | 323000448 | $500 | $1,000 | ($500) | $500.00 | | 3 |
| 11 | 323000448 | $300 | $500 | ($200) | $300.00 | | 3 |
| 12 | 323000448 | $200 | $300 | ($100) | $200.00 | | 3 |
| 13 | 323000448 | $200 | $200 | | $200.00 | | 3 |
| 14 | 323000448 | $200 | $200 | | $200.00 | | 3 |
| 15 | 323000448 | $6,500 | $200 | $6,300 | $1,100.12 | $5,399.88 | 3 |
| 16 | 323000448 | $6,300 | $6,500 | ($200) | $900.12 | $5,399.88 | 3 |
| 17 | 323000448 | $6,200 | $6,300 | ($100) | $800.12 | $5,399.88 | 3 |
| 18 | 323000448 | $5,500 | $6,200 | ($700) | $100.12 | $5,399.88 | 3 |
| 19 | 323000448 | $5,500 | $5,500 | | $100.12 | $5,399.88 | 3 |
| 20 | 323000448 | $4,500 | $5,500 | ($1,000) | $1,100.12 | $3,399.88 | 4 |
| 21 | 323000448 | $4,100 | $4,500 | ($400) | $700.12 | $3,399.88 | 4 |
| 22 | 323000448 | $3,100 | $4,100 | ($1,000) | $1,100.12 | $1,999.88 | 5 |
| 23 | 323000448 | $2,600 | $3,100 | ($500) | $600.12 | $1,999.88 | 5 |
| 24 | 323000448 | $2,200 | $2,600 | ($400) | $200.12 | $1,999.88 | 5 |
| 25 | 323000448 | $4,200 | $2,200 | ($2,000) | $1,100.12 | $3,099.88 | 5 |
| 26 | 323000448 | $4,000 | $4,200 | ($200) | $900.12 | $3,099.88 | 5 |
| 27 | 323000448 | $3,700 | $4,000 | ($300) | $600.12 | $3,099.88 | 5 |
| 28 | 323000448 | $3,500 | $3,700 | ($200) | $400.12 | $3,099.88 | 5 |
| 29 | 323000448 | $3,100 | $3,500 | ($400) | $0.12 | $3,099.88 | 5 |
| 30 | 323000448 | $3,100 | $3,100 | | $0.12 | $3,099.88 | 5 |
| Averages: | | $ 3,176.67 | | | | $2,596.57 | 81.7% |

Note: This was the best threshold reached during the Optimize Low Phase

Note: $1625.59 was high value starting point saved from the Optimize High Phase

Figure 4g

SYSTEM AND METHOD FOR DETERMINING OPTIMAL SWEEP THRESHOLD PARAMETERS FOR DEMAND DEPOSIT ACCOUNTS

TECHNICAL FIELD OF THE INVENTION

The present invention is directed, in general, to a computing system and, more specifically, to a system and method, employable within an accounting system for a financial institution, for determining optimal sweep threshold parameters for demand deposit accounts ("DDAs").

BACKGROUND OF THE INVENTION

Commercial banks are required by regulation to produce periodic "call" reports which summarize a bank's Demand Deposit Account (DDA), e.g., checking account, liabilities and reserve balances over a seven day period. Based on these reports, banks must set aside a tiered percentage of DDA balances and hold the funds in "reserve" at the Federal Reserve Bank. The requirement that certain funds be held in reserve, however, limits the amount of bank resources available for investment purposes, such as making loans.

With the advent of recent changes in Federal Reserve regulations, financial institutions are now permitted to "restructure" certain DDAs as "non-transaction" accounts. The restructuring is accomplished by the creation of what are commonly referred to as "sub" accounts on the liability side of the bank's general ledger system that effectively lower the balances subject to the reserve requirement. The primary advantage of lower reserves is that it frees up a percentage of these funds to be used by the commercial bank for additional lending and other revenue-generating activities.

The accounts into which money is "moved" from the DDA may be referred to as the "sub-DDA" and the "sub-MMA" (Money Market Accounts), the sum of the sub-DDA and sub-MMA balances equaling the DDA balance. The average balance maintained in a sub-MMA represents the average amount of funds not subject to reserve requirements, a portion of which are available to the bank for investment purposes. By retaining a "threshold" balance in the sub-DDA, any excess funds over the threshold amount can be moved into the sub-MMA, thereby effectively lowering the balance on which the reserve requirement is calculated. This technique of accounting presents no impact to the bank customer, however, because the DDA ledger balance is not altered in any fashion.

Because sufficient funds must always be maintained in the sub-DDA to satisfy customer demands, a determination of the proper threshold for a DDA requires an analysis of the history of account activity. If the sub-DDA balance becomes less than or equal to zero, then sufficient funds should be "swept" (i.e., moved) from the sub-MMA to the sub-DDA as necessary to bring the sub-DDA balance up to the original threshold.

Current regulations limit the maximum number of sweeps to six per month. Once six sweeps are incurred, the customer account can only show funds in the sub-DDA account and the sub-MMA is effectively cleared to zero; i.e., if a sixth sweep is required, all funds in the sub-MMA must be swept into the sub-DDA to avoid exceeding the sweep limit, regardless of the threshold selected. The sweep counter is reset to zero at the beginning of each calendar month and a new sweep threshold, based on the prior month's account activity, is recalculated, with excess funds (i.e., funds exceeding the sweep threshold) in the sub-DDA being moved into the sub-MMA account. Optimizing the sweep threshold for each DDA allows a bank to maximize the average sub-MMA balance, thus minimizing the funds in the sub-DDA that are subject to reserve requirements and enhancing a bank's investment opportunity.

The difficulty for any commercial bank in optimizing the sweep threshold for each DDA is in determining the precise sweep threshold that should be set, either for the bank at large, the sub-product (account type) level, or the account level. Setting a generic threshold dollar amount for the bank, or accounts within a particular sub-product group, may not adequately reflect the debit activity affecting an individual account and may thus not be the optimal threshold for all accounts. For example, if the predetermined sweep threshold is too low, then a DDA may reach the maximum of six sweeps too early in the month; any future deposits that occur later in that month could not be moved into the sub-MMA. This presents an opportunity loss for the bank as the customer account has already reached the maximum number of sweeps allowed by regulation much too early within the calendar month. Similarly, if the threshold is set too high, then few, if any, sweeps will occur. This means that there are excess funds in the sub-DDA that could have been, but were not, moved into the sub-MMA. This situation also presents an opportunity loss for the bank as it must continue to maintain reserves on the sub-DDA portion of the account.

Therefore, what is needed in the art is a system and method for determining optimal sweep threshold parameters for DDAs.

SUMMARY OF THE INVENTION

To address the above-discussed deficiencies of the prior art, it is a primary object of the present invention to provide a way of finding an optimal sweep threshold parameter.

In the attainment of the above primary object, the present invention provides, in a financial institution accounting system, a system for, and method of, determining an optimal sweep threshold parameter for a demand deposit account ("DDA"), the DDA having a sub-DDA contra-account ("sub-DDA") and a sub-money market account ("sub-MMA") associated therewith. The system includes: (1) an initialization routine that sets a trial sweep threshold parameter equal to a value that is a function of an activity of the DDA during a historical period of time and (2) a trial sweep routine that performs a trial sweep process on the DDA during the period of time, a timing of sweeps from the sub-MMA to the sub-DDA occurring during the trial sweep process being a function of the trial sweep threshold parameter, the sweep routine repeated with a modified trial sweep threshold parameter until modification of the trial sweep threshold parameter fails to produce an increase in an average balance of the sub-MMA for the predetermined period of time, the trial sweep threshold parameter thereby determined to be an optimal sweep threshold parameter for the DDA. A "routine," as used herein, may be software-based, meaning, for example, program, task, subroutine, function, procedure, or even a set or subset of executable instructions; more broadly, the term defines hardware- and firmware-based implementations, as well as combinations of software, hardware and firmware.

The present invention, as recited above, therefore sets forth an iterative method for determining the optimal sweep threshold parameter. The present invention is the first to apply advanced numerical techniques to the problem of determining an optimal sweep threshold parameter. The present invention extends beyond numerical techniques however. Closed form solution (by means of an equation and free of iteration) is also within the broad scope of the present invention.

In a preferred embodiment of the present invention, the initialization routine sets the trial sweep threshold parameter equal to a value that is a function of a maximum number of sweeps desired to occur in the DDA during the period of time. In an embodiment to be described more fully, the desired maximum number is 5, inasmuch as current regulations allow a maximum of 6 sweeps per month. With 5 sweeps, 1 sweep remains in case extraordinary activity occurs within the DDA that merits an additional sweep during a given month.

In a preferred embodiment of the present invention, the modified trial sweep threshold parameter is determined according to an iterative numerical method. In a more preferred embodiment, the modified trial sweep threshold parameter is determined according to a Newtonian binary division method. Those of skill in the art will recognize that many numerical methods exist to determine an optimal solution. The Newtonian binary division method is well known as an abstract mathematical concept. However, it has never been applied to the field of financial institution accounting systems, much less to the specific problem of determining an optimal sweep threshold parameter.

In a preferred embodiment of the present invention, the trial sweep threshold parameter is modified by being both increased and decreased during operation of the trial sweep routine. As will be seen, the specific embodiment to be illustrated and described involves both increasing and decreasing the trial sweep threshold parameter in between performing the trial sweep processes. However, some optimization methods require merely that the trial sweep threshold parameter be either increased or decreased, not both.

In a preferred embodiment of the present invention, the trial sweep threshold parameter is constrained to be above a minimum value that produces a number of sweeps equal to a regulated maximum number of sweeps to occur in the DDA during the period of time. In the embodiment to be illustrated and described, the regulated maximum number of sweeps, per current United States Federal Reserve Bank regulations, is 6 per month. The present invention is by no means limited to this value for a regulated maximum number.

In a preferred embodiment of the present invention, the period of time is 1 month. The pertinent period of time, per current United States Federal Reserve Bank regulations, is 1 month. Again, 6 sweeps is the maximum allowed per month.

In a preferred embodiment of the present invention, the initialization routine sets the trial sweep threshold parameter equal to a value that equals a maximum balance attained by the DDA during the period of time. Alternatively, the initialization routine sets the trial sweep threshold parameter equal to a sum of debits made to the DDA during the period of time divided by a number that is a function of a regulated maximum number of sweeps to occur in the DDA during the period of time. This, of course, is an "initial guess" as to the optimal sweep threshold parameter; iterative methods need an initial guess to begin their operation. The initial guess should be as good as possible to minimize the number of iterations required on average. However, those of skill in the art will recognize that an iterative method can determine the optimal sweep threshold parameter from even a bad guess.

In a preferred embodiment of the present invention, the trial sweep routine loads a table with values representing daily balances of the DDA during the period of time to perform the trial sweep process. The daily balances allow the present invention to play "what if" with the DDA during the period of time. In the iterative form of the present invention, "what if" is played over and over, with different trial sweep threshold parameters, until the optimal sweep threshold parameter is found.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, in which:

FIG. 3 illustrates exemplary account data and associated parameters based on a proposed initial sweep threshold formula;

FIG. 4-A illustrates exemplary account data and associated parameters for a first iteration of an exemplary divide-by-two phase;

FIG. 4-B illustrates exemplary account data and associated parameters for a last iteration of an exemplary divide-by-two phase;

FIG. 4-C illustrates exemplary account data and associated parameters for a mid-divide point iteration of an exemplary divide-by-two phase;

FIG. 4-D illustrates exemplary account data and associated parameters for a first iteration of an exemplary optimize-high phase;

FIG. 4-E illustrates exemplary account data and associated parameters for a last iteration of an exemplary optimize-high phase;

FIG. 4-F illustrates exemplary account data and associated parameters for a first iteration of an exemplary optimize-low phase; and FIG. 4-G illustrates exemplary account data and associated parameters for a last iteration of an exemplary optimize-low phase.

DETAILED DESCRIPTION

Figure 1:
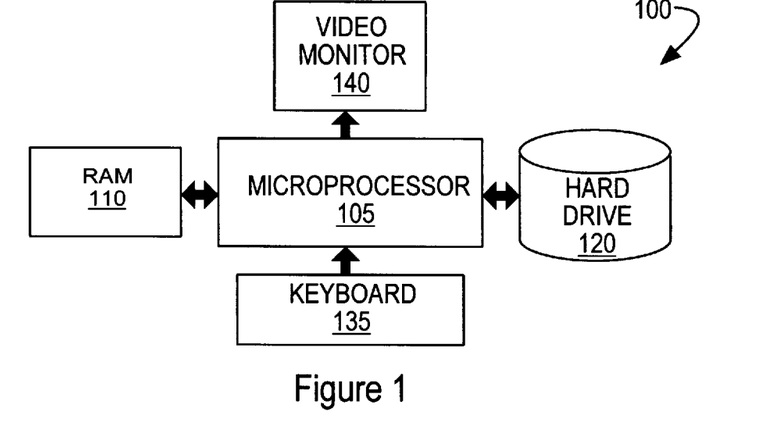
FIG. 1 illustrates a block diagram of an exemplary computer which provides a suitable environment within which the principles of the present invention may be implemented and operated.

Referring initially to FIG. 1, illustrated is a block diagram of an exemplary computer (generally designated 100) which provides a suitable environment within which the principles of the present invention may be implemented and operated. Exemplary computer 100 illustratively includes processing circuitry 105 (e.g., at least one conventional processor), conventional volatile memory (e.g., random access memory) 110, and a non-volatile memory (e.g., a hard disk drive) 120. Processing circuitry 105, volatile memory 110 and non-volatile memory 120 are associated with each other and cooperatively operate to execute the processes disclosed by the present invention. "Associated with" and derivatives thereof, as used herein, may mean to include within, interconnect with, contain, be contained within, connect to or with, couple to or with, be communicable with, juxtapose, cooperate with, interleave, be a property of, be bound to or with, have, have a property of, or the like. Exemplary computer 100 may further include an input/output device 135, such as a keyboard, and a display device 140, such as a video monitor. A keyboard may be used to control the execution of the process disclosed by the present invention in exemplary computer 100, and a video monitor may be used to view the results of the process disclosed herein.

The principles of the present invention are not limited to a particular processing environment, but may be implemented in any processing system architecture, including, without limitation, microcomputers (e.g., "personal computers") and main-frame computers. Conventional processing system architecture is discussed in *Computer Organization and Architecture*, by William Stallings, MacMillan Publishing Co. (3rd ed. 1993); and conventional processing system network design is discussed in *Data Network Design*, by Darren L. Spohn, McGraw-Hill, Inc. (1993). Each of the foregoing publications is incorporated herein by reference.

As described hereinabove, the difficulty in maximizing the average sub-MMA balance is in determining the precise sweep threshold that should be set for either the bank at large, at the sub-product (e.g., account type) level, or at the account level. Setting a generic threshold dollar amount for the bank may not adequately reflect the debit activity affecting an individual account and thus may not be the optimal threshold for all accounts. For example, if the predetermined sweep threshold is too low, then a DDA account may reach the six sweep maximum too early in the month; any future deposits that may occur later in that month could not be moved into the sub-MMA account. Similarly, if the threshold is set too high, then few, if any, sweeps will occur, resulting in excess funds in the sub-DDA account that could have been, but were not, moved into the sub-MMA account.

To address the problem of maximizing the average sub-MMA balance, the present invention discloses a process whereby a sweep threshold parameter is optimized as a function of the account activity of the DDA during a historical period of time. A trial sweep routine is used to perform a trial sweep process on the DDA during the historical period of time; a timing of sweeps from the sub-MMA to the sub-DDA occurring during the trial sweep process being a function of the trial sweep threshold parameter. The sweep routine is repeated with a modified trial sweep threshold parameter until modification of the trial sweep threshold parameter fails to produce an increase in an average balance of the sub-MMA for the predetermined historical period of time, at which point the trial sweep threshold parameter is determined to be an optimal sweep threshold parameter for the DDA.

For purposes of evaluating the method of the present invention, an initial sweep threshold formula is proposed as:

Sweep threshold=(sum of the DDA debits for the month )/5

The above calculation uses five (5) for the divisor as this is the optimal number of sweeps, according to current banking regulations, for a customer account. A sixth sweep, while being the maximum allowable, would require that all funds be moved back to the sub-DDA. The initial sweep threshold proposed above, however, is inadequate as an optimal threshold since it merely produces an "average" or mean value of the customer debits, and does not allow for variances in balance changes caused by very large or very small debits that may occur. Although the variances could be somewhat accounted for through the calculation of the standard deviation of customer debits, the standard deviation would simply disclose the "average deviation," or change, from the average debit. The method disclosed herein, however, reveals that statistical measures of this nature do not yield the optimal threshold.

The present invention recognizes that bank customers' check-writing habits are generally consistent—based on the observation that people typically pay about the same "amounts" at about the same "times" each month for such expenses as rent, mortgage, groceries, utilities, insurance, etc. Thus, with the average twice-a-month pay period in the United States, banks generally see a larger balance occurring in most accounts at the beginning and at the middle of each month. Furthermore, census data discloses that most Americans save little over the course of a given month, and thus banks continue to see a gradual decline in account balances, from the interim high balances that occur twice in a given month, until the beginning of the next pay period. Although certain aberrations appear in this pattern—with additional deposits of gifts, annual tax refunds, etc. and purchases of large appliances or automobiles, higher winter utility payments, etc.—over the course of time, there appears to be a consistent decline in balance levels over the month as people spend their earnings around the same time each month on everyday necessities. The present invention, recognizing these patterns in the form of daily DDA balance changes, discloses a novel process for determining the optimal sweep threshold, whereby the average sub-MMA balance is maximized.

The process disclosed hereinafter is based, in part, on a "Newtonian" binary algorithm. Isaac Newton postulated that a simple square root calculation could be derived by using binary division techniques. To illustrate the application of "binary" division techniques to the problem of finding the square root of a number, the method can be summarized as follows:

| | |
|---|---|
| Step 1 | Lowvalue = 0 |
| | Highvalue = Original value (i.e., number to find square root of) |
| Step 2 | Quotient = (Lowvalue + Highvalue)/2 |
| Step 3 | Product = (Quotent * Quotient, or Quotient ^ 2) |
| Step 4 | If Produrt > Original value, then Set Highvalue = Quotient, and go to step 2 |
| | If Product = Original value, then Product equals square root of Original value |
| | (At this point Product must be < Original value) |
| | Set Lowvalue = Quotient and go to step 2 |

In order to find the square root of any number, say 200, one could start by simply taking the sum of a low value and a high value and divide the sum by 2. The resulting quotient would then be multiplied by itself (i.e., squared) and the product compared to the original number. If the product was greater than 200, that meant that the quotient was too large; the high value then being set equal to the quotient and the process repeated with the low value being left unchanged. If the product was less than 200, this meant that the quotient was too small and thus needed to be increased in order to yield a product of 200. The quotient is increased by setting the low value equal to the current quotient value and then repeating the repeating the process with the high value being left unchanged. The process is repeated until the product (i.e., quotient squared) equals the original value (or until the difference between the high and low values is either nearly infinitesimal or is equal to a predetermined "termination," or "difference," factor), meaning that the current quotient is equal to (or substantially equal to) the square root of the original value. The present invention discloses an application of the technique of binary division to determine the optimal sweep threshold parameters for a DDA.

Figure 2:
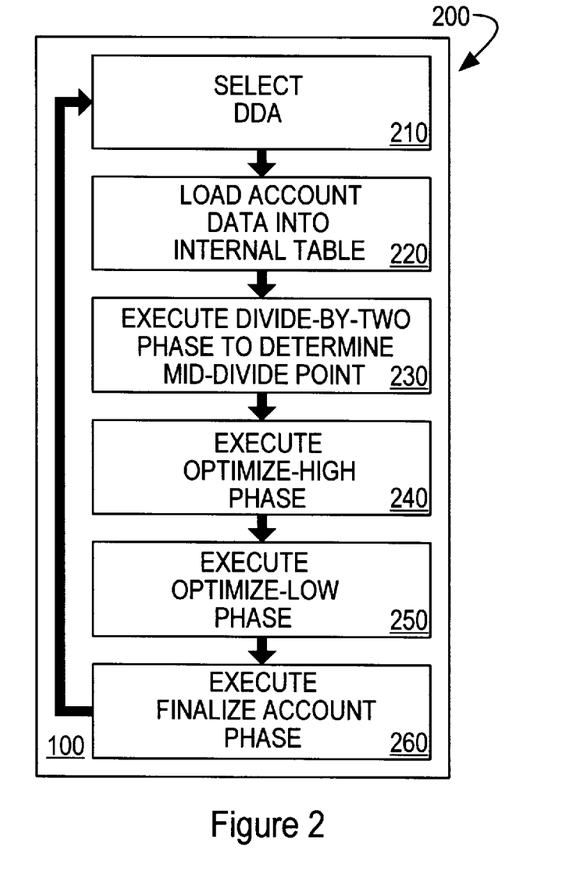
FIG. 2 illustrates a flow chart of an exemplary process, which may be implemented and executed in the exemplary computer illustrated in FIG. 1, for determining optimal sweep threshold parameters for DDAs according to the principles of the present invention.

Turning now to FIG. 2, illustrated is a flow chart 200 of an exemplary process for determining optimal sweep threshold parameters for DDAs according to the principles of the present invention. The process includes, without limitation, a Step 210 in which a DDA for which an optimal threshold is desired is selected; a Step 220 in which account data for a selected DDA is loaded into an internal table in exemplary computer 100; a Step 230 in which a "divide-by-two" phase, as described hereinafter, is executed to determine a "mid-divide point;" a Step 240 in which an "optimize-high" phase is executed; a Step 250 in which an "optimize-low" phase is executed; and a Step 260 in which a "finalize account" phase is executed. In one embodiment, the exemplary process of Steps 210–260 is incorporated in a financial institution (e.g., bank) accounting system, which is executed in exemplary computer 100. In a related embodiment, the financial institution accounting system is automated and is suitably operative to manage the DDAs of a financial institution.

The following provides a summary of the Steps 210 through 250 for an exemplary process, employing the principles of the present invention, for determining an optimal sweep threshold of a DDA (selected in Step 210):

1. (Step 220) Load the monthly account balance activity into a table.
2. (Step 230) Set the initial sweep threshold equal to the high balance for the account. Perform the sweep process using the initial sweep threshold. When the sweep process is complete, calculate an initial sub-MMA average balance by dividing the sum of the sub-MMA balances by the number of days in the analysis. Calculate a new (modified) sweep threshold by dividing the initial threshold value by 2. Continue dividing the threshold by 2, and use iterative processing of the table, until the sub-MMA average can no longer be improved from the initial sub-MMA average balance. If the sub-MMA average balance is not improved through the initial binary division process, then it is apparent that the selected threshold has no effect on the average balance; in this case, since there is little account activity, the sweep threshold can preferably be set to a low value, e.g., $1.00, and the analysis is terminated for the present DDA.
3. If it is possible to improve the sub-MMA average balance, then the sweep threshold is increased (Step 240; "optimize-high" phase) to determine whether the sub-MMA average balance can be further improved (i.e., increased). If it is improved, processing is continued from that point downward (Step 250; "optimize-low" phase) until the average balance is not further improved. In other words, the general goal is to determine a sweep threshold that produces the highest possible sub-MMA average balance.

Prior to processing, in Step 220, account information for a selected DDA is loaded into an internal table. Using an internal table may improve processing performance and allow the sweep threshold to be varied on a repeated basis in order to simulate the true movement of funds. A software module can be used to read in account data from a user-created file that contains the account number and ending ledger balance for the first day in a predetermined historical period of time. Subsequent records, containing account data for subsequent days, are retrieved until the last day in the predetermined historical period of time is reached. Those skilled in the art will recognize that the principles of the present invention are not limited to a particular format or method for storing and retrieving account data.

Table 1, below, illustrates exemplary records for a DDA that may be loaded into an internal table in volatile memory 110 of exemplary computer 100. Each record in the table may include the following data for a specific day in the predetermined historical period of time:

TABLE 1

| TABLE POSITION | FIELD/SLOT DESCRIPTION |
| --- | --- |
| 1 | Account Number |
| 2 | Current Balance |
| 3 | Previous Balance |
| 4 | Balance Change (positive or negative) |
| 5 | Sub-DDA Balance |
| 6 | Sub-MMA Balance |
| 7 | Number of Sweeps |

If the predetermined historical period of time is chosen to have a period of one month, the table dimensions should be 31 by 7 to accommodate up to 31 days of account data. A "slot counter" can be incremented for each record in the account and used as a subscript into the table.

According to a preferred embodiment, the table is initialized to zeros (i.e., "000 . . . ") prior to reading the first record, except for the low balance value which is initialized to all nines (i.e., "999 . . . "). During the table load process, the account balance in each record is compared against the low and high balance values in the table. Because the low balance value is initialized to all nines, almost any comparison against this value will result in the first account balance being moved to the low balance. The same holds true for the high balance, as it was initialized to zeros. Thereafter, the balance stored in each succeeding record is compared to the low and high balance fields. At the end of the load process, the low and high balances for the account are known.

During the table load process, the change in balance for each day in the predetermined historical period of time is determined. If the slot counter is greater than one, the current balance from the previous slot is placed into the previous balance for the current slot; since the first slot has no previous balance, this operation is not performed for slot one. If the slot counter is greater than one, however, the balance change is calculated by subtracting the previous balance from the current balance. In addition, a counter is used to accumulate debit differences, and the slot counter is stored in a total records field. If the total debit difference is negative (which it should be), it is made positive by multiplying by "−1."

After loading DDA information into an internal table, an initial sweep threshold is selected, which, in a preferred embodiment, is set equal to the high balance for the predetermined historical period of time. Once the table is loaded, as described supra, the main iterative process is used to perform the actual sweep simulation using the data stored in the table. The sweep simulation process is applied to the table (up to the maximum number of slots; e.g., 31 times if the predetermined historical period of time is selected to be one month) in a series of loops according to the following principles:

1. If the slot position is one (1), an initial movement of funds into the sub-MMA is accomplished by setting the sub-DDA position in this slot equal to the initial threshold; the sub-MMA position is calculated by subtracting the sub-DDA position from the current balance. If the sub-MMA position is negative, this means that the account did not have sufficient funds to do the initial movement of funds, in which case all current balance funds are moved to the sub-DDA and the sub-MMA is cleared to zeros. The next slot number is then fetched and loop processing is continued.
2. If there is no change in the account balance (i.e., the balance difference=0), the sub-DDA balance, sub-MMA balance, and number of sweeps are carried forward from the previous slot. The next slot number is then fetched and loop processing is continued.
3. If the balance change is positive, indicating that the customer had more credit dollars than debit dollars, it is determined whether the customer has reached the maximum sweep limit. If the maximum sweep limit has been reached, the positive balance change is added to the sub-DDA position, and the sub-MMA and number of sweeps are carried over; if the maximum sweep limit has not been reached, a portion, or all, of the positive balance change, sufficient to set the sub-DDA equal to the threshold, is added to the sub-DDA position, with the remaining funds added to the sub-MMA, and the prior slot's number of sweeps are carried over. The next slot number is then fetched and loop processing is continued.
4. At this point, it is known that the balance change is negative, indicating that the customer had more debit dollars than credit dollars, and the accumulators for total debit count and total debit dollars are incremented. Because the balance change is negative, it is added to the sub-DDA balance within the table, which has the effect of essentially lowering the sub-DDA balance.

If, after adding the negative balance change to the sub-DDA balance, the sub-DDA balance is greater than zero, it is concluded that the customer had sufficient funds to cover the debit withdrawal on the account. The previous slot values for the sub-MMA and number of sweeps are carried over, and the next slot number is fetched and loop processing is continued.

If, however, as a result of adding the negative balance change to the sub-DDA balance, the sub-DDA is less than or equal to zero, it is necessary to sweep funds from the sub-MMA back to the sub-DDA to cover the shortage. It is necessary, however, to first check and see if the customer has already reached the maximum allowable sweep limit. If the customer has reached the maximum, the sub-DDA position is set equal to the current balance and the sub-MMA is set equal to zero. If the customer has not reached the maximum sweep limit and the customer's sub-DDA is less than or equal to zeros, an "amount-to-add" field is calculated. The amount-to-add field, which is equal to the current sweep threshold plus the absolute value of the DDA ledger balance change, is added to the sub-DDA balance (restoring it to the threshold value) and subtracted from the sub-MMA balance, effectively lowering it. This covers the debit activity shortage in the sub-DDA balance and also restores the sub-DDA balance to the current sweep threshold value. As a result of moving funds from the sub-MMA balance to the sub-DDA balance, it is necessary to determine whether the sub-MMA balance is now negative; if it is, the sub-MMA field (which would be negative) is added to the sub-DDA field and the sub-MMA field is set equal to zero. We then fetch the next slot number. The next slot number is then fetched and loop processing is continued.

After the entire table has been processed as described above, the resulting table data is processed to accumulate the current DDA balance and sub-MMA balance into a totals field. The sub-MMA total is needed to determine the average sub-NMA balance, which is calculated by dividing the sub-MMA total by the total number of used slots in the table. If, at this point, the table has been processed using only the initial sweep threshold flag, the average sub-MMA is stored in a first sub-MMA average field; otherwise, it is stored in a last sub-MMA average field. The foregoing iterative process is then repeated, according to the optimization techniques described hereinafter, to determine the optimal sweep threshold value.

After executing the first iterative process using the account high balance as the initial sweep threshold, the average sub-MMA balance is stored for comparison against subsequently calculated values, from which an optimal sweep threshold value can be determined. Using the Newtonian binary algorithm described above, the high value is set equal to the account high balance and the low value is set equal to the last threshold amount which gave us the initial "best MMA average," if one was preset, or zeros. The current sweep threshold is then set equal to the sum of the high and low values divided by two (2), and the table is again processed using the above-described iterative process. Each time the simulated sweep process is completed, the sweep threshold is divided by two (2) and the process repeated until the average sub-MMA balance does not reflect an improvement (i.e., an increase) over the previous average sub-MMA balance. The point at which no further improvement is achieved is referred to as the "mid-divide" point.

Continuing the optimization process, the mid-divide point sweep threshold value is increased toward the high balance value to see whether the average sub-MMA balance can be further improved; this phase being referred to as "optimizing high" (Step 240). To select the next ("modified") sweep threshold value, the low value is set equal to the current sweep threshold (from the mid-divide point optimization phase) and the high value is set equal to the high balance; the high and low values summed and divided by two (2). The following rules are then applied to see whether the average sub-MMA balance has been improved:

1. The difference between the low and high value is calculated; if the difference value is less than the predetermined difference factor, the optimize high phase is terminated and the "optimize low" phase, described hereinafter, is conducted.
2. If the average sub-MMA balance has improved, the sweep threshold value for the improved sub-MMA balance is set as the low value, the high value is left unchanged, and the binary division process is continued. If the average sub-MMA balance has not improved, the current sweep threshold value is set as the high value, the low value is left unchanged, and the binary division process is continued.

Those skilled in the art will recognize that, from the foregoing description, the sweep threshold is continually moved toward the high balance value. Simulation results have shown, however, that, more often than not, no improvement will be realized during the optimize high phase, with the mid-divide point being the most likely starting point to realize an improvement in the average sub-MMA balance.

Continuing the optimization process, the mid-divide point sweep threshold value is decreased toward zero to see whether the average sub-MMA balance can be further improved; this phase being referred to as "optimizing low" (Step 250). To select the next ("modified") sweep threshold value, the high value is set equal to the last sweep threshold (saved from the prior optimization phase) and the low value is set equal to zero; the high and low values summed and divided by two (2). The following rules are then applied to see whether the average sub-MMA balance has been improved:

1. The difference between the low and high value is calculated; if the difference value is less than the predetermined difference factor, the optimize low phase is terminated and the "finish account" phase, described infra, is conducted.
2. If the average sub-MMA balance has improved, the sweep threshold value for the improved sub-MMA balance is set as the high value, the low value is left unchanged, and the binary division process is continued. If the average sub-MMA balance has not improved, the current sweep threshold value is set as the low value, the high value is left unchanged, and the binary division process is continued.

The optimize low phase of the looping process (i.e. the sweep simulation for different threshold values) is continued until the difference value is less than or equal to the predetermined difference factor; if preferred, the process may also be terminated if the difference value for the previous loop is equal to the difference value for the current loop, which means that the calculated quotient has not changed from the previous value. Those skilled in the art will recognize that, from the foregoing description, the sweep threshold is continually moved toward a lower threshold. Simulation results have shown that, more often than not, an improvement in the average sub-MMA balance will be realized during the optimize low phase. Following termination of the optimize low phase, the finish account phase (Step 260) is conducted.

During the finish account phase, the optimal sweep threshold for the account is stored and the account totals, if desired, may be recorded to an output file for reporting purposes. At this time, processing of the present account is complete, and the process can then be applied to a new DDA (Step 210).

Figure 4A:
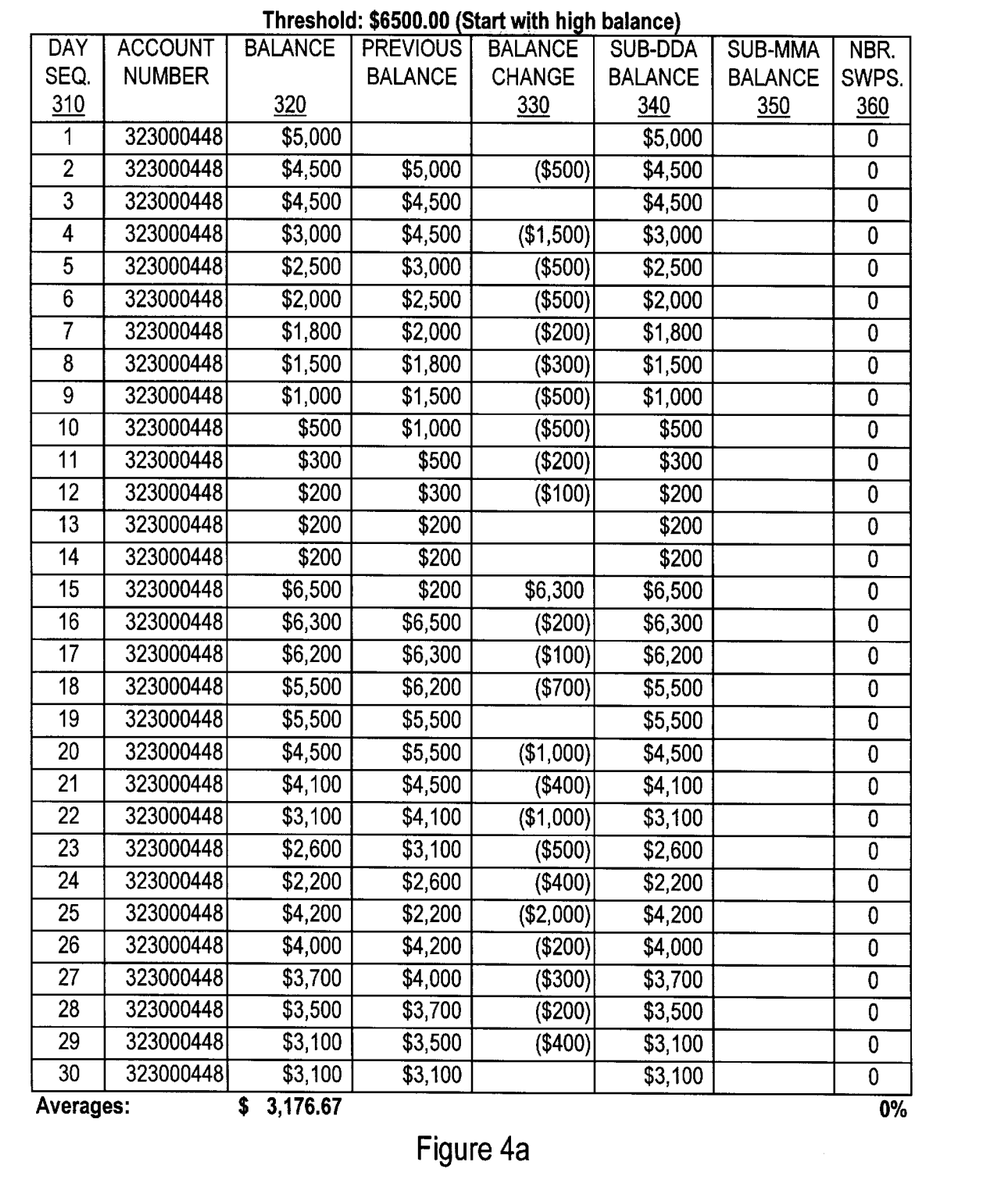

To illustrate the operation of the system and method of the present invention for determining an optimal sweep threshold, reference is now made to FIG. 3 and FIGS. 4-A through 4-G. Referring to FIG. 3, illustrated are exemplary account data and associated parameters based on the proposed initial sweep threshold formula. The data includes a first column 310 that defines each day in the historical period of time to which the process is applied to determine an optimal sweep threshold; a second column 320 that provides the account balance for each day in the historical period of time; and a third column 330 that provides the change in the account balance on each day of the historical period of time. The sum of the account debits is summed and divided by five to arrive at a sweep threshold value of $2040.00.

Using the exemplary proposed initial sweep threshold of $2040.00, a fourth column 340 and a fifth column 350 provide the running balances for each of the sub-DDA and sub-MMA accounts, respectively. A sixth column 360 provides the cumulative number of sweeps recorded, for each day, using the current trial sweep threshold. According to the principles disclosed hereinabove, those skilled in the art will recognize that, for the exemplary account data illustrated, the proposed threshold yields an average sub-MMA balance of $2085.33, which means that 65.6 percent of the average account balance (i.e. $3,176.67) would not be subject to reserve requirements. Using the same exemplary account data, FIGS. 4-A through 4-G illustrate a process in accordance with the principles of the present invention for optimizing the sweep threshold, whereby the average sub-MMA balance is maximized.

Turning now to FIGS. 4-A through 4-G, illustrated are tables of exemplary account data and associated parameters for exemplary iterations of a process for determining an optimal sweep threshold according to the principles of the present invention. The exemplary account data is the same in each figure, with each figure illustrating the changes in the sub-DDA and sub-MMA balances, and the corresponding number of sweeps, based on the trial sweep threshold used. As noted hereinabove, in one embodiment the high balance for the account is selected as an initial trial sweep threshold. Thus, referring to FIG. 4-A, illustrated are exemplary account data and associated parameters for a first iteration of an exemplary divide-by-two phase using the high balance of $6,500.00 as a trial sweep threshold; subsequent iterations using a sweep threshold equal to one-half of the sweep threshold used in the previous iteration. In one embodiment, the account data is reprocessed for each subsequent trial sweep threshold until the sweep threshold is less than a predetermined minimum threshold value. For each iteration, the average sub-MMA balance is compared to the highest average sub-MMA balance found during the previous iterations; if the average sub-MMA balance for the current iteration is greater than the previous high, the high value is replaced by the current average sub-MMA and saved with the current trial sweep threshold. Thus, the average sub-MMAs for all iterations are effectively compared to determine the optimal sweep threshold (i.e. the sweep threshold which yields the maximum average sub-MMA balance).

Turning now to FIG. 4-B, illustrated are exemplary account data and associated parameters for a last iteration (for a predetermined minimum threshold value of $1.00) of an exemplary divide-by-two phase. During the divide-by-two phase, the sweep threshold that produces the highest average sub-MMA balance is selected as the "mid-divide point." FIG. 4-C illustrates exemplary account data and associated parameters for the mid-divide point iteration of an exemplary divide-by-two phase. The mid-divide point, having a sweep threshold value of $1,625.00, is subsequently used as a low value for the sweep threshold, and the high balance for the account being used as a high value, during an optimize high phase.

Turning now to FIG. 4-D, illustrated are exemplary account data and associated parameters for a first iteration of an exemplary optimize-high phase. In accordance with the binary search technique described supra, in one embodiment, the first iteration of the optimize high phase adds the high value (i.e. the high balance for the account during the historical period of time) to the low value (i.e. the mid-divide point from the divide-by-two phase) and divides by two to select a trial sweep threshold (e.g. $4,062.50). Continuing to use the binary search technique, other trial sweep thresholds are selected in an attempt to locate an optimal sweep threshold that maximizes the average sub-MMA balance. The trial sweep threshold which produces the highest average sub-MMA balance during the optimize high phase is then used as the high value for the binary search algorithm during an optimize low phase. FIG. 4-E illustrates exemplary account data and associated parameters for a last iteration of an exemplary optimize-high phase. For the exemplary account data, the best sweep threshold (e.g. $1,625.59) was reached during the last iteration of the optimize high phase; those skilled in the art will recognize that for different account data, however, the best sweep threshold during the optimize high phase may occur at a point anywhere between the mid-divide point and the high balance for the account.

Turning now to FIG. 4-F, illustrated are exemplary account data and associated parameters for a first iteration of an exemplary optimize-low phase. In accordance with the binary search technique described supra, in one embodiment, the first iteration of the optimize low phase adds a low value (i.e. zero) to a high value (i.e. the best sweep threshold found during the optimize high phase) and divides by two to select a trial sweep threshold (e.g. 812.79). Continuing to use the binary search technique, other trial sweep thresholds are selected in an attempt to locate an optimal sweep threshold that maximizes the average sub-MMA balance. The trial sweep threshold which produces the highest average sub-MMA balance during the optimize low phase is determined to be the optimal sweep threshold for the given account. FIG. 4-G illustrates exemplary account data and associated parameters for a last iteration of an exemplary optimize-low phase. For the exemplary account data, the best sweep threshold was reached during the last iteration of the optimize low phase; those skilled in the art will recognize that for different account data, however, the best sweep threshold during the optimize low phase may occur at a point anywhere between the high and low values used to select the initial trial sweep threshold at the beginning of the optimize low phase.

For purposes of comparison, it can be noted in FIG. 3 that the initially proposed sweep threshold formula (i.e. sum of the debits divided by five), produced an average sub-MMA balance ($2,085.33) equal to 65.6% of the average DDA account balance ($3,176.67). As shown in FIG. 4-G, however, the method disclosed herein for determining an optimal sweep threshold results in an average sub-MMA balance ($2,596.57) equal to 81.7% of the average DDA account balance ($3,176.67). Thus, the method disclosed herein can significantly increase a bank's average sub-MMA account balances, thereby decreasing the funds subject to reserve requirements and increasing the amount of bank resources available for investment purposes.

Using the principles disclosed by the present invention, 21,000 accounts taken from a realistic commercial bank in the United States were processed to determine the optimal sweep threshold for each account. From the results of the simulation it was observed that there were only 161 accounts that reached the maximum sweep limit. More importantly, over 10,000 (48%) accounts were in the five sweep category, indicating that optimization of the sweep threshold was realized for many accounts. Furthermore, the optimization of the sweep threshold based on realistic patterns of check-writing activity resulted in a reduction in the average sweep threshold of over 67% and an increase in the average sub-MMA balance of over 13%. The net result being that funds needed to cover debit activity were swept at the optimal time to minimize the sub-DDA balances and thus maximize the funds kept in the sub-MMA accounts, thereby reducing the bank's required reserves.

From the above, it is apparent that the present invention provides, in a financial institution accounting system, a system for and method of determining an optimal sweep threshold parameter for a demand deposit account ("DDA"), the DDA having a sub-DDA contra-account and a sub-money market account ("sub-MMA") associated therewith.

The system includes: (1) an initialization routine that sets a trial sweep threshold parameter equal to a value that is a function of an activity of the DDA during a historical period of time and (2) a trial sweep routine that performs a trial sweep process on the DDA during the period of time, a timing of sweeps from the sub-MMA to the sub-DDA occurring during the trial sweep process being a function of the trial sweep threshold parameter, the sweep routine repeated with a modified trial sweep threshold parameter until modification of the trial sweep threshold parameter fails to produce an increase in an average balance of the sub-MMA for the predetermined period of time, the trial sweep threshold parameter thereby determined to be an optimal sweep threshold parameter for the DDA.

Although the present invention and its advantages have been described in detail, those skilled in the art should understand that they can make various changes, substitutions and alterations herein without departing from the spirit and scope of the invention in its broadest form.

What is claimed is:

1. In a financial institution accounting system, a system for determining an optimal sweep threshold parameter for a demand deposit account (DDA), said DDA having a sub-DDA contra-account and a sub-money market account (sub-MMA) associated therewith, said system comprising:

an initialization routine that sets a trial sweep threshold parameter equal to a value that is a function of an activity of said DDA during a historical period of time; and a trial sweep routine that performs a trial sweep process on said DDA during said period of time, a timing of sweeps from said sub-MMA to said sub-DDA occurring during said trial sweep process being a function of said trial sweep threshold parameter, said sweep routine repeated with a modified trial sweep threshold parameter until modification of said trial sweep threshold parameter fails to produce an increase in an average balance of said sub-MMA for said predetermined period of time, said trial sweep threshold parameter thereby determined to be an optimal sweep threshold parameter for said DDA.

2. The system as recited in claim 1 wherein said initialization routine sets said trial sweep threshold parameter equal to a value that is a function of a maximum number of sweeps desired to occur in said DDA during said period of time.

3. The system as recited in claim 1 wherein said modified trial sweep threshold parameter is determined according to an iterative numerical method.

4. The system as recited in claim 1 wherein said modified trial sweep threshold parameter is determined according to a Newtonian binary division method.

5. The system as recited in claim 1 wherein said trial sweep threshold parameter is modified by being both increased and decreased during operation of said trial sweep routine.

6. The system as recited in claim 1 wherein said trial sweep threshold parameter is constrained to be above a minimum value that produces a number of sweeps equal to a regulated maximum number of sweeps to occur in said DDA during said period of time.

7. The system as recited in claim 1 wherein said period of time is 1 month.

8. The system as recited in claim 1 wherein said initialization routine sets said trial sweep threshold parameter equal to a value that equals a maximum balance attained by said DDA during said period of time.

9. The system as recited in claim 1 wherein said initialization routine sets said trial sweep threshold parameter equal to a sum of debits made to said DDA during said period of time divided by a number that is a function of a regulated maximum number of sweeps to occur in said DDA during said period of time.

10. The system as recited in claim 1 wherein said trial sweep routine loads a table with values representing daily balances of said DDA during said period of time to perform said trial sweep process.

11. In a financial institution accounting system, a method of determining an optimal sweep threshold parameter for a demand deposit account (DDA), said DDA having a sub-DDA contra-account and a sub-money market account (sub-MMA) associated therewith, said method comprising the steps of:
(a) setting a trial sweep threshold parameter equal to a value that is a function of an activity of said DDA during a historical period of time;
(b) performing a trial sweep process on said DDA during said period of time, a timing of sweeps from said sub-MMA to said sub-DDA occurring during said trial sweep process being a function of said trial sweep threshold parameter;
(c) repeating said step of performing with a modified trial sweep threshold parameter until modification of said trial sweep threshold parameter fails to produce an increase in an average balance of said sub-MMA for said predetermined period of time, said trial sweep threshold parameter thereby determined to be an optimal sweep threshold parameter for said DDA; and
(d) employing said optimal sweep threshold parameter in said financial institution accounting system to determine a timing of prospective sweeps to occur in said DDA.

12. The method as recited in claim 11 wherein said step of setting comprises the step of setting said trial sweep threshold parameter equal to a value that is a function of a maximum number of sweeps desired to occur in said DDA during said period of time.

13. The method as recited in claim 11 wherein said modified trial sweep threshold parameter is determined according to an iterative numerical method.

14. The method as recited in claim 11 wherein said modified trial sweep threshold parameter is determined according to a Newtonian binary division method.

15. The method as recited in claim 11 wherein said trial sweep threshold parameter is modified by being both increased and decreased during repeatings of said step of performing.

16. The method as recited in claim 11 further comprising the step of constraining said trial sweep threshold parameter to be above a minimum value that produces a number of sweeps equal to a regulated maximum number of sweeps to occur in said DDA during said period of time.

17. The method as recited in claim 11 wherein said period of time is 1 month.

18. The method as recited in claim 11 wherein said step of setting comprises the step of setting said trial sweep threshold parameter equal to a value that equals a maximum balance attained by said DDA during said period of time.

19. The method as recited in claim 11 wherein said step of setting comprises the step of setting said trial sweep threshold parameter equal to a sum of debits made to said DDA during said period of time divided by a number that is a function of a regulated maximum number of sweeps to occur in said DDA during said period of time.

20. The method as recited in claim 11 further comprising the step of loading a table with values representing daily balances of said DDA during said period of time to perform said trial sweep process.

21. An automated accounting system for managing demand deposit accounts (DDAs) of a financial institution, each of said DDAs having a sub-DDA contra-account and a sub-money market account (sub-MMA) associated therewith, said accounting system comprising:
data storage that contains ongoing activity data pertaining to each of said DDAs;
processing circuitry that performs an ongoing sweep process on said DDA to move funds from said sub-MMA to said sub-DDA as a function of a balance of said DDA and an optimal sweep threshold parameter; and
a system, executable in said processing circuitry, that determines said optimal sweep threshold parameter, including:
an initialization routine that sets a trial sweep threshold parameter equal to a value that is a function of an activity of said DDA during a historical period of time, and
a trial sweep routine that performs a trial sweep process on said DDA during said period of time, a timing of sweeps from said sub-MMA to said sub-DDA occurring during said trial sweep process being a function of said trial sweep threshold parameter, said sweep routine repeated with a modified trial sweep threshold parameter until modification of said trial sweep threshold parameter fails to produce an increase in an average balance of said sub-MMA for said predetermined period of time, said trial sweep threshold parameter thereby determined to be an optimal sweep threshold parameter for said DDA, said processing circuitry employing said optimal sweep threshold parameter in performing said ongoing sweep process on said DDA.

22. The system as recited in claim 21 wherein said initialization routine sets said trial sweep threshold parameter equal to a value that is a function of a maximum number of sweeps desired to occur in said DDA during said period of time.

23. The system as recited in claim 21 wherein said modified trial sweep threshold parameter is determined according to an iterative numerical method.

24. The system as recited in claim 21 wherein said modified trial sweep threshold parameter is determined according to a Newtonian binary division method.

25. The system as recited in claim 21 wherein said trial sweep threshold parameter is modified by being both increased and decreased during operation of said trial sweep routine.

26. The system as recited in claim 21 wherein said trial sweep threshold parameter is constrained to be above a minimum value that produces a number of sweeps equal to a regulated maximum number of sweeps to occur in said DDA during said period of time.

27. The system as recited in claim 21 wherein said period of time is 1 month.

28. The system as recited in claim 21 wherein said initialization routine sets said trial sweep threshold parameter equal to a value that equals a maximum balance attained by said DDA during said period of time.

29. The system as recited in claim 21 wherein said initialization routine sets said trial sweep threshold parameter equal to a sum of debits made to said DDA during said period of time divided by a number that is a function of a regulated maximum number of sweeps to occur in said DDA during said period of time.

30. The system as recited in claim 21 wherein said trial sweep routine loads a table with values representing daily balances of said DDA during said period of time to perform said trial sweep process.

31. A method of operating an accounting system to manage demand deposit accounts (DDAs) of a financial institution, each of said DDAs having a sub-DDA contra-account and a sub-money market account (sub-MMA) associated therewith, said method comprising the steps of:

storing ongoing activity data pertaining to each of said DDAs in data storage;

employing processing circuitry to perform an ongoing sweep process on said DDA to move funds from said sub-MMA to said sub-DDA as a function of a balance of said DDA and an optimal sweep threshold parameter; and determining said optimal sweep threshold parameter by:
 (a) setting a trial sweep threshold parameter equal to a value that is a function of an activity of said DDA during a historical period of time,
 (b) performing a trial sweep process on said DDA during said period of time, a timing of sweeps from said sub-MMA to said sub-DDA occurring during said trial sweep process being a function of said trial sweep threshold parameter, and
 (c) repeating said step of performing with a modified trial sweep threshold parameter until modification of said trial sweep threshold parameter fails to produce an increase in an average balance of said sub-MMA for said predetermined period of time, said trial sweep threshold parameter thereby determined to be an optimal sweep threshold parameter for said DDA; and employing said optimal sweep threshold parameter in performing said ongoing sweep process on said DDA.

32. The method as recited in claim 31 wherein said step of setting comprises the step of setting said trial sweep threshold parameter equal to a value that is a function of a maximum number of sweeps desired to occur in said DDA during said period of time.

33. The method as recited in claim 31 wherein said modified trial sweep threshold parameter is determined according to an iterative numerical method.

34. The method as recited in claim 31 wherein said modified trial sweep threshold parameter is determined according to a Newtonian binary division method.

35. The method as recited in claim 31 wherein said trial sweep threshold parameter is modified by being both increased and decreased during repeatings of said step of performing.

36. The method as recited in claim 31 further comprising the step of constraining said trial sweep threshold parameter to be above a minimum value that produces a number of sweeps equal to a regulated maximum number of sweeps to occur in said DDA during said period of time.

37. The method as recited in claim 31 wherein said period of time is 1 month.

38. The method as recited in claim 31 wherein said step of setting comprises the step of setting said trial sweep threshold parameter equal to a value that equals a maximum balance attained by said DDA during said period of time.

39. The method as recited in claim 31 wherein said step of setting comprises the step of setting said trial sweep threshold parameter equal to a sum of debits made to said DDA during said period of time divided by a number that is a function of a regulated maximum number of sweeps to occur in said DDA during said period of time.

40. The method as recited in claim 31 further comprising the step of loading a table with values representing daily balances of said DDA during said period of time to perform said trial sweep process.

* * * * *

UNITED STATES PATENT AND TRADEMARK OFFICE
CERTIFICATE OF CORRECTION

PATENT NO. : 5,893,078
DATED : April 6, 1999
INVENTOR(S) : Frank L. Paulson

It is certified that error appears in the above-identified patent and that said Letters Patent is hereby corrected as shown below:

Col. 10, line 11, "sub-NMA" should be --sub-MMA--.

Signed and Sealed this

Thirty-first Day of August, 1999

Attest:

Q. TODD DICKINSON

Attesting Officer

Acting Commissioner of Patents and Trademarks